(12) United States Patent
Gruhl et al.

(10) Patent No.: US 7,593,940 B2
(45) Date of Patent: Sep. 22, 2009

(54) SYSTEM AND METHOD FOR CREATION, REPRESENTATION, AND DELIVERY OF DOCUMENT CORPUS ENTITY CO-OCCURRENCE INFORMATION

(75) Inventors: Daniel Frederick Gruhl, San Jose, CA (US); Daniel Norin Meredith, Sunnyvale, CA (US)

(73) Assignee: International Business Machines Corporation, Armonk, NY (US)

( * ) Notice: Subject to any disclaimer, the term of this patent is extended or adjusted under 35 U.S.C. 154(b) by 264 days.

(21) Appl. No.: 11/442,377

(22) Filed: May 26, 2006

(65) Prior Publication Data

US 2007/0276830 A1   Nov. 29, 2007

(51) Int. Cl.
*G06F 17/30* (2006.01)
(52) U.S. Cl. .............................................. 707/7; 704/9
(58) Field of Classification Search ................ 707/7
See application file for complete search history.

(56) References Cited

U.S. PATENT DOCUMENTS

| | | | | |
|---|---|---|---|---|
| 5,619,709 A * | 4/1997 | Caid et al. | | 715/209 |
| 5,978,792 A * | 11/1999 | Bhargava et al. | | 707/2 |
| 5,987,460 A | 11/1999 | Niwa et al. | | |
| 6,058,392 A * | 5/2000 | Sampson et al. | | 707/6 |
| 6,442,545 B1 | 8/2002 | Feldman et al. | | |
| 7,007,015 B1 * | 2/2006 | Nayak | | 707/4 |
| 7,031,910 B2 * | 4/2006 | Eisele | | 704/10 |
| 7,139,752 B2 * | 11/2006 | Broder et al. | | 707/4 |
| 7,213,198 B1 * | 5/2007 | Harik | | 715/234 |
| 7,289,911 B1 * | 10/2007 | Rigney | | 702/19 |
| 7,302,442 B2 * | 11/2007 | Sampson et al. | | 707/101 |
| 2002/0165884 A1 | 11/2002 | Kreulen et al. | | |
| 2003/0229626 A1 * | 12/2003 | Nayak | | 707/3 |
| 2004/0064438 A1 * | 4/2004 | Kostoff | | 707/1 |
| 2004/0199495 A1 | 10/2004 | Colbath et al. | | |
| 2005/0049867 A1 * | 3/2005 | Deane | | 704/245 |
| 2005/0143971 A1 | 6/2005 | Burstein et al. | | |
| 2007/0185871 A1 * | 8/2007 | Canright et al. | | 707/7 |

OTHER PUBLICATIONS

Author: Nazli Goharian, Ankit Jain, Qian Sun, Information Retrieval Laboratory Illinois Institute Of Technology Title: Comparative Analysis of Spare Matrix Algorithms For Information Retrieval. Date: Year 2003. Publisher: Illinois Institute Of Technology.Pertinent pp. 1-9.*

(Continued)

*Primary Examiner*—Shahid A Alam
*Assistant Examiner*—Anh Tai V Tran
(74) *Attorney, Agent, or Firm*—John L. Rogitz

(57) ABSTRACT

To respond to queries that relate to co-occurring entities on the Web, a compact sparse matrix representing entity co-occurrences is generated and then accessed to satisfy queries. The sparse matrix has groups of sub-rows, with each group corresponding to an entity in a document corpus. The groups are sorted from most occurring entity to least occurring entity. Each sub-row within a group corresponds to an entity that co-occurs in the document corpus, within a co-occurrence criterion, with the entity represented by the group, and to facilitate query response the sub-rows within a group are sorted from most occurring co-occurrence to least occurring co-occurrence.

1 Claim, 5 Drawing Sheets

OTHER PUBLICATIONS

Author: Nawaaz Ahmed, Nikolay Mateev, Keshav Pingali, and Paul Stodghill, Department of Computer Science—Cornell University. Title: A Framework for Sparse Matrix Code Synthesis from High-level Specifications. Date: Year 2000. Publisher: Department of Computer Science—Cornell University on http://sc2000.org. Pertinent pp. 1-13.*

Author: Nawwaaz Ahmed, Nikolay Mateev, Keshav Pingali, and Paul Stodghill; Title: "A Framwork for Sparse Matrix Code Synthesis from High-level Specifications"; Date: year 2000; Publisheer: IEEE; Pertinent Pages: whole document.*

* cited by examiner

SYSTEM AND METHOD FOR CREATION, REPRESENTATION, AND DELIVERY OF DOCUMENT CORPUS ENTITY CO-OCCURRENCE INFORMATION

FIELD OF THE INVENTION

The present invention relates generally to creating, representing, and delivering entity co-occurrence information pertaining to entities in a document corpus such as the World Wide Web.

BACKGROUND

The Internet is a ubiquitous source of information. Despite the presence of a large number of search engines, however, all of which are designed to respond to queries for information by returning what is hoped to be relevant query responses, it remains problematic to filter through search results for the answers to certain types of queries that existing search engines do not effectively account for. Among the types of queries that current search engines inadequately address are those that relate in general not just to a single entity, such as a single person, company, or product, but to entity combinations that are bounded by co-occurrence criteria between the entities. This is because it is often the case that the co-occurrence criteria can be unnamed in the sense that it may not be readily apparent why a particular co-occurrence exists.

For example, consider the sentence "in their speech Sam Palmisano and Steve Mills announced a new version of IBM's database product DB2 will ship by the end of third quarter." This sentence contains the following example unnamed co-occurrences:

Sam Palmisano and Steve Mills, Sam Palmisano and IBM, Sam Palmisano and DB2, Steve Mills and IBM, Steve Mills and DB2.

One might wish to inquire of a large document corpus such as the Web, "which person co-occurs most often with IBM?", but present search engines largely cannot respond to even a simple co-occurrence query like this one. Other co-occurrence questions with important implications but currently no effective answers exist, such as which medical conditions are most often mentioned with a drug, which technologies most often mentioned with a company, etc. With these critical observations in mind, the invention herein is provided.

SUMMARY OF THE INVENTION

A computer is programmed to execute logic that includes receiving a query, and in response to the query, accessing a sparse matrix that contains information which represents co-occurrences of entities in a document corpus. Information obtained in the accessing act is returned as a response to the query.

In one non-limiting implementation, the sparse matrix has groups of sub-rows, and each group corresponds to an entity in the document corpus. The groups are sorted in the sparse matrix from most occurring entity to least occurring entity, with each sub-row of a group corresponding to an entity co-occurring in the document corpus, within at least one co-occurrence criterion, with the entity represented by the group. The sub-rows within a group are sorted from most occurring co-occurrence to least occurring co-occurrence.

In the preferred non-limiting implementation, the logic can further include, in response to the query, accessing a row index that points to a starting position of a group of sub-rows in the sparse matrix. The logic can also include, in response to the query, accessing a header including at least two bytes, the first of which indicates a file version and the second byte of which indicates a number of bytes used for at least one cardinality representing a corresponding number of entity co-occurrences. The cardinality may be expressed exactly or using a two-byte approximation.

If desired, the logic can also include accessing a string table including an index and a corresponding data string. The index can be a concatenated list of integers representing offsets of entity-representing strings in the data string, and the entity-representing strings in the data string may be listed in descending order of frequency of occurrence in the document corpus.

In another aspect, a service includes receiving a query for information contained in the World Wide Web, and returning a response to the query at least in part by accessing a data structure including a sparse matrix.

In yet another aspect, a method for responding to queries for information in a document corpus includes receiving the query and using at least a portion of the query as an entering argument to access a sparse matrix. A response to the query is returned based on the access of the sparse matrix.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
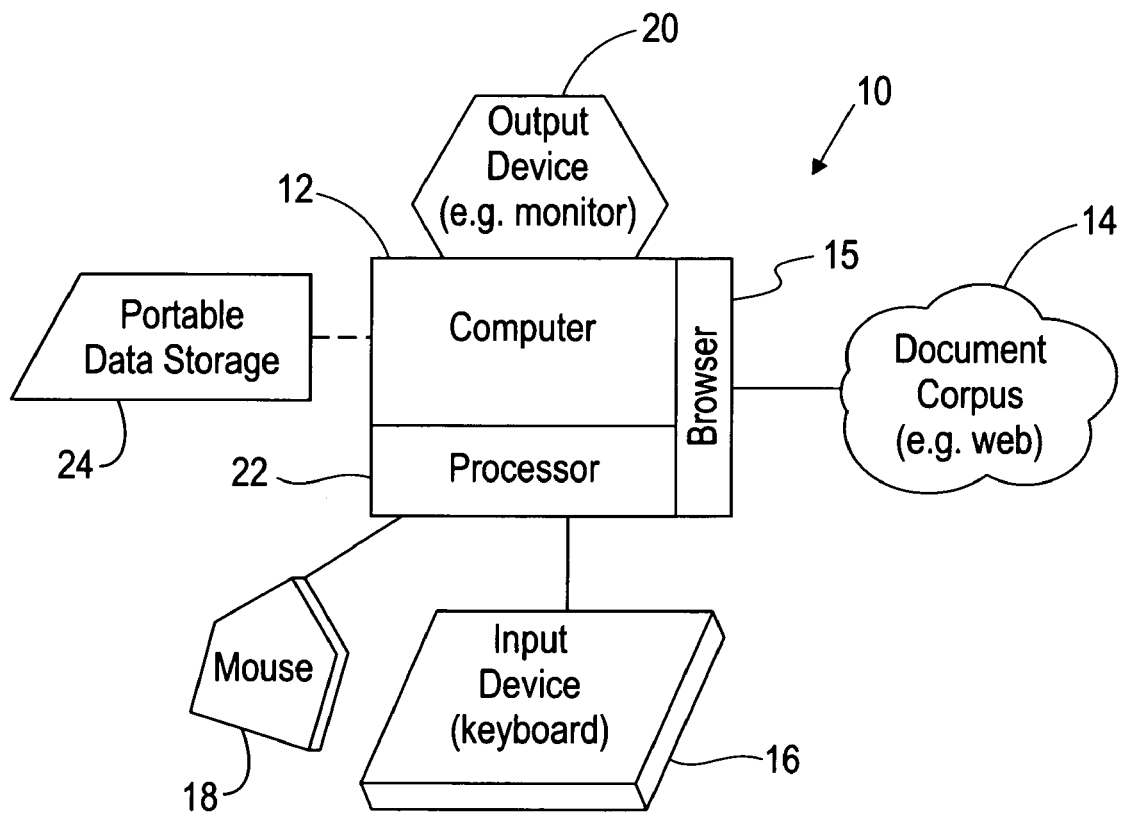
FIG. 1 is a schematic diagram of a non-limiting computer system that can be used to create and use the data structures shown herein to return responses to user queries.

Referring initially to FIG. 1, a system is shown, generally designated 10, that includes one or more computers 12 (only a single computer 12 shown in FIG. 1 for clarity of disclosure) that can communicate with a corpus 14 of documents. The corpus 14 may be the World Wide Web with computer-implemented Web sites, and the computer 12 can communicate with the Web by means of a software-implemented browser 15. The computer 12 includes input devices such as a keyboard 16 and/or mouse 18 or other input device for inputting programming data to establish the present data structures and/or for inputting subsequent user queries and accessing the data structures to return responses to the queries. The computer 12 can use one or more output devices 20 such as a computer monitor to display query results.

It is to be appreciated that the data structures below which facilitate co-occurrence querying can be provided to the computer 12 for execution thereof by a user of the computer so that a user can input a query and the computer can return a response. It is to be further understood that in other aspects, a user can access the Web or other network, input a query to a Web server or other network server, and the server can access the data structures herein to return a response to the query as a paid-for service. Yet again, the data structures, owing to their compact size, may be provided on the below-described removable portable data storage medium and vended to users, who may purchase the portable data storage medium and engage it with their own personal computers to query for co-occurrences.

The computer 12 can be, without limitation, a personal computer made by International Business Machines Corporation (IBM) of Armonk, N.Y. or equivalent. Other digital processors, however, may be used, such as a laptop computer, mainframe computer, palmtop computer, personal assistant, or any other suitable processing apparatus. Likewise, other input devices, including keypads, trackballs, and voice recognition devices can be used, as can other output devices, such as printers, other computers or data storage devices, and computer networks.

In any case, the computer 12 has a processor 22 that executes the logic shown herein. The logic may be implemented in software as a series of computer-executable instructions. The instructions may be contained on a data storage device with a computer readable medium, such as a computer diskette. Or, the instructions may be stored on random access memory (RAM) of the computers, on a hard disk drive, electronic read-only memory, optical storage device, or other appropriate data storage device. In an illustrative embodiment of the invention, the computer-executable instructions may be lines of JAVA code.

Indeed, the flow charts herein illustrate the structure of the logic of the present invention as embodied in computer program software. Those skilled in the art will appreciate that the flow charts illustrate the structures of computer program code elements including logic circuits on an integrated circuit, that function according to this invention. Manifestly, the invention is practiced in its essential embodiment by a machine component that renders the program code elements in a form that instructs a digital processing apparatus (that is, a computer) to perform a sequence of function steps corresponding to those shown.

Completing the description of FIG. 1, owing to the relatively efficient, compact size (in some implementations, less than two gigabytes) of the sparse matrix and accompanying string table described herein that can be used to respond to user queries, the sparse matrix and string table may be stored on a removable data storage media 24 such as a DVD, CD, thumb drive, solid state portable memory device, etc.

Figure 2:
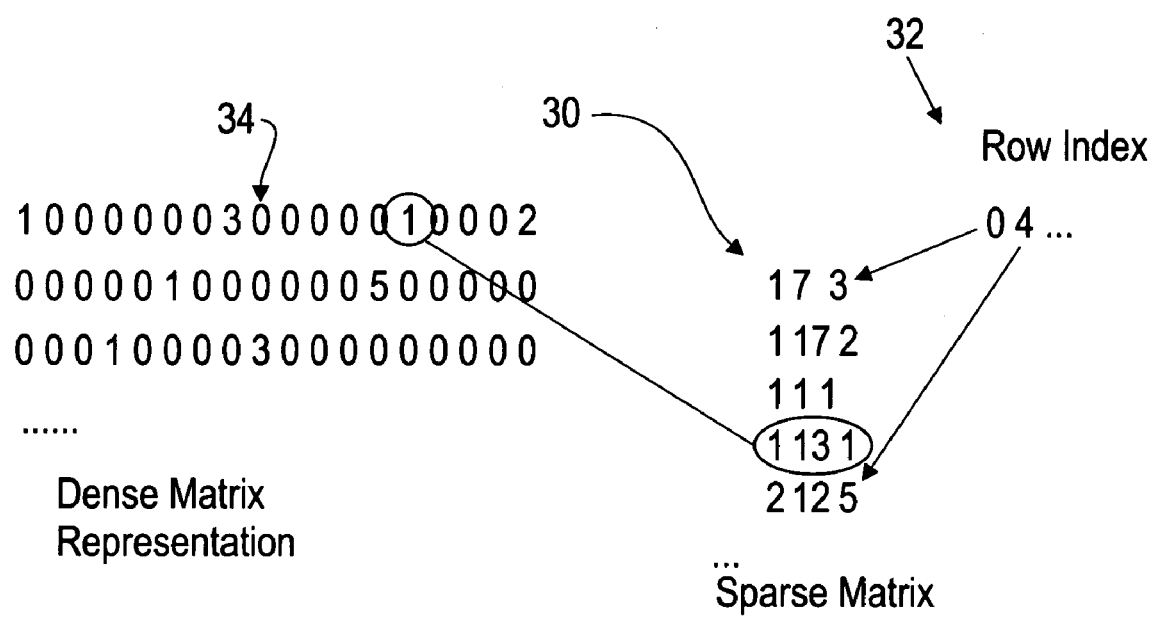
FIG. 2 is a schematic representation of the present sparse matrix with row index, along with a counterpart dense matrix representation that is shown only for illustration.

Now referring to FIG. 2, a data structure that is generated for searching for co-occurrences of entities in the document corpus 14 is shown and is referred to herein as an "s-web". Essentially, in the preferred implementation an s-web includes a header (not shown), a string table which lists the names of the entities to be considered, and a sparse matrix 30 of the co-occurrences with row index 32. As can be seen comparing the sparse matrix 30 with a corresponding dense matrix representation 34, the representation of the sparse matrix drops zeroes in the dense matrix to make the resulting data structure as compact as possible. However, the sparse matrix 30 is not merely the dense matrix 34 with the zeroes dropped, but rather is a representation of the dense matrix with zeroes dropped and data rearranged. Details of the sparse matrix will be discussed further below, but first the header and string table will be described.

First considering the header, in a preferred non-limiting implementation the header includes two bytes, the first of which indicates the file version and the second of which indicates the number of bytes used for cardinalities and offsets. Smaller tables can use less bytes per entry.

As set forth further below, as used herein a "cardinality" refers to the number of co-occurrences between two entities. The header can indicate the largest cardinality in the sparse matrix, either exactly or using a two-byte approximation (reduced format) such as a 10+6 bit mantissa and order of magnitude exponent.

The preferred non-limiting string table can have two parts, namely, an index and the corresponding data. The index is a concatenated list of integers (preferably represented using the minimum number of bytes) that provides the offsets of the various strings. String length may be calculated by subtraction from the next occurring string.

The index of the string table is followed by the per-string data, which lists each entity represented in the sparse matrix. The entities in the data portion of the string table preferably are listed in descending order of frequency of occurrence in the document corpus 14, for reasons that will become clear shortly. The string data can be compressed if desired, but should be compressed on a per string basis, so it often makes more sense to simply compress the whole file at the file system level.

In generating the string table, the entities in the document corpus are obtained as set forth further below, sorted, and then concatenated to produce the string data portion of the string table, with their offsets calculated and recorded in the index portion. Thus, a portion of the string table might appear as follows:

data portion: Dan SmithUSPTOIBM . . . , index 0 10 15 . . . , it being understood that "0" in the index points to just before "Dan Smith" (which starts at the zero position in the string data), "10" in the index points to just before "USPTO" (which starts at the tenth position in the data string), and "15" in the index points to just before "IBM" (which starts at the fifteenth position in the data string).

Returning to the sparse matrix 30, in the preferred implementation a row in the dense matrix, which represents a single entity, is broken into sub-rows in the sparse matrix, with each sub-row representing a column from the corresponding row in the dense matrix representation. Thus, a group of sub-rows in the sparse matrix corresponds to an entity in the document corpus. A column in the dense matrix representation (and hence a sub-row in the sparse matrix 30) corresponds to an entity that has satisfied the co-occurrence criteria with the row entity as further discussed below, and the value in the column indicates the number of co-occurrences of the two entities. Since most entities co-occur with only a small subset of all the entities in the corpus, the dense matrix representation is mostly composed of zeroes as shown. With this critical observation, the sparse matrix 30 is provided.

The groups of sub-rows in the sparse matrix 30 are sorted in two ways. First, the order of the groups themselves depends on the frequency of occurrence of the corresponding entities in the document corpus, i.e., the first group of sub-rows correspond to the most commonly occurring entity in the document corpus 14, the second group of sub-rows represents the second-most commonly occurring entity, and so on. This method of sorting facilitates responding to queries such as "what is the most common cough syrup mentioned on the web?" Recall that the entities in the string table data portion are similarly sorted, i.e: the first string is the most commonly occurring entity and so on.

Thus, as shown in FIG. 2, the first group of sub-rows (those beginning with the numeral "1") correspond to a single entity, in fact the most frequently occurring entity in the document corpus. To further conserve space, the first numeral of each sub-row of the sparse matrix 30 may be dropped in implementation, with the row index 32 being used to point to the beginning of each new group of sub-rows as shown.

The second numeral in each sub-row represents a non-zero column from the dense matrix representation, and the third numeral represents the value in the column. In the example shown in FIG. 2, there are four sub-rows in the first group, with the first sub-row indicating that a value of "3" corresponds to column "7", the second sub-row indicating that a value of "2" corresponds to column "17", the third sub-row indicating that a value of "1" corresponds to the first column, and the fourth sub-row indicating that a value of "1" corresponds to the thirteenth column.

Accordingly, the second way in which the sparse matrix 30 is sorted may now be appreciated. Not only are the groups of sub-rows intersorted by frequency of occurrence of the corresponding entities, but within each group, the sub-rows are intrasorted by cardinality, with the sub-row indicating the highest number of co-occurrences first, the sub-row indicating the second-highest number of co-occurrences second, and so on. This second way in which the sparse matrix 30 is sorted thus facilitates responding to queries such as "which cough syrups are most often co-mentioned with aspirin?"

Figure 3:
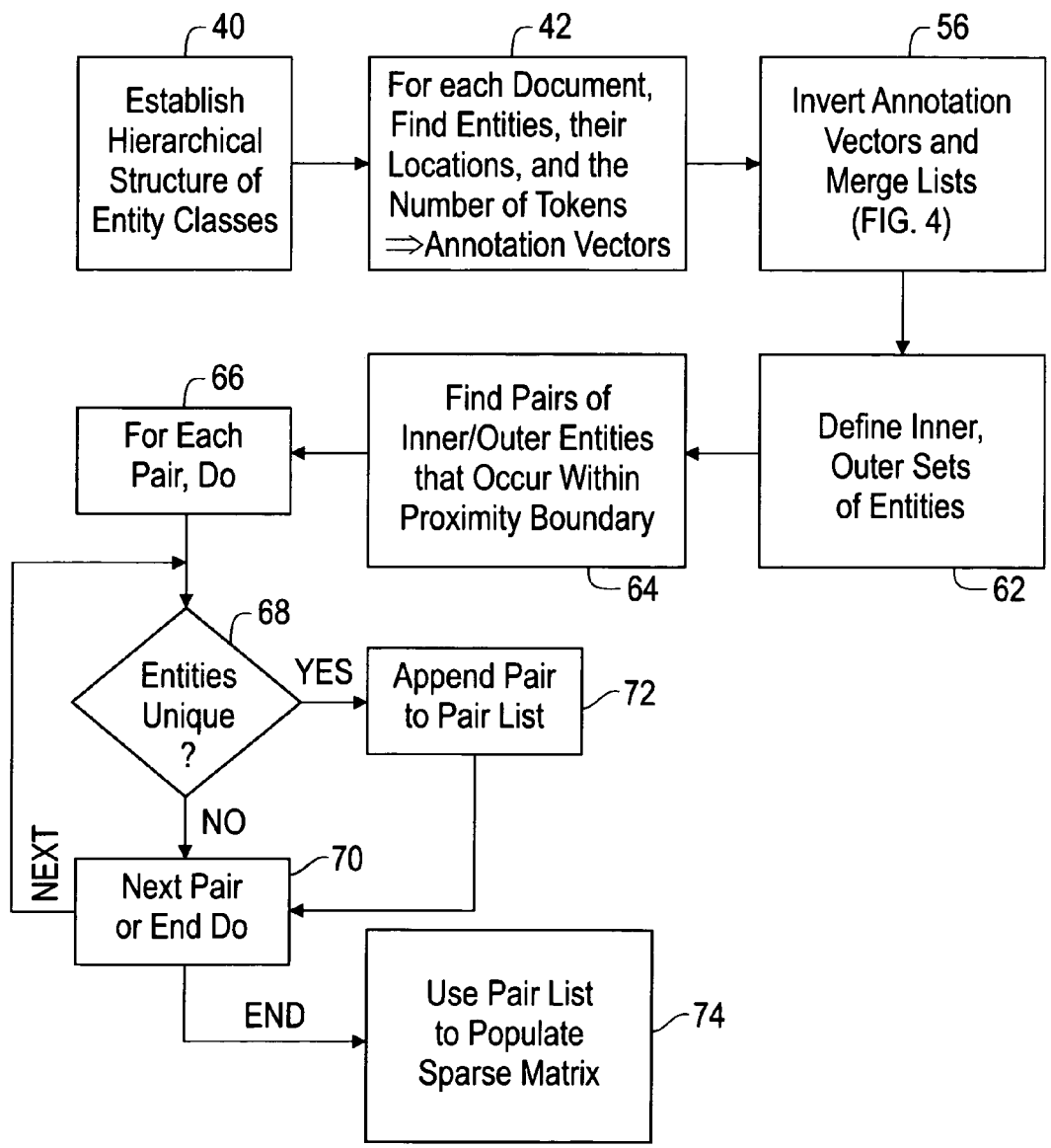
FIG. 3 is a flow chart of the logic for establishing the sparse matrix.
Figure 4:
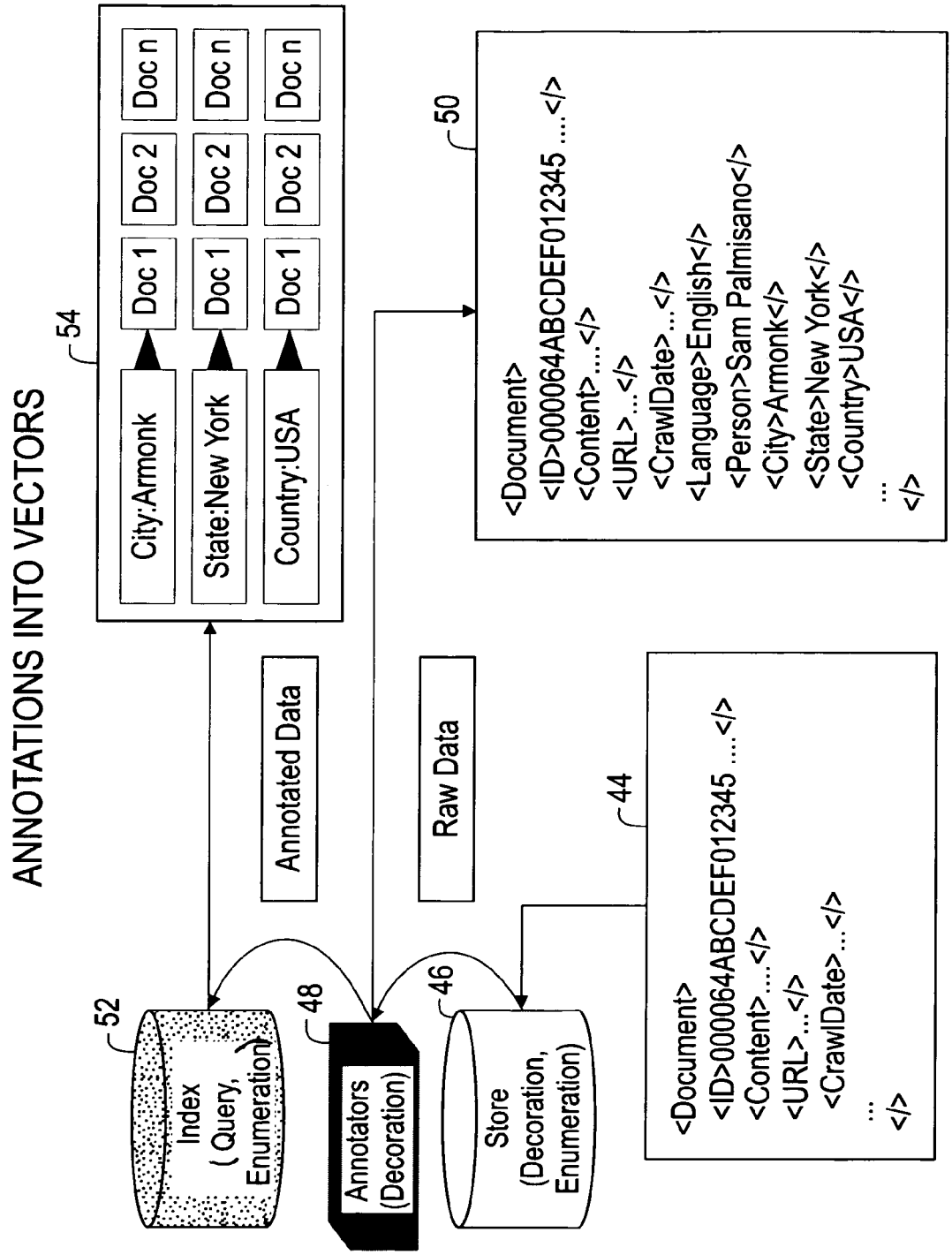
FIGS. 4 and 5 show various data structures that can be used as part of the logic of FIG. 3.
Figure 5:
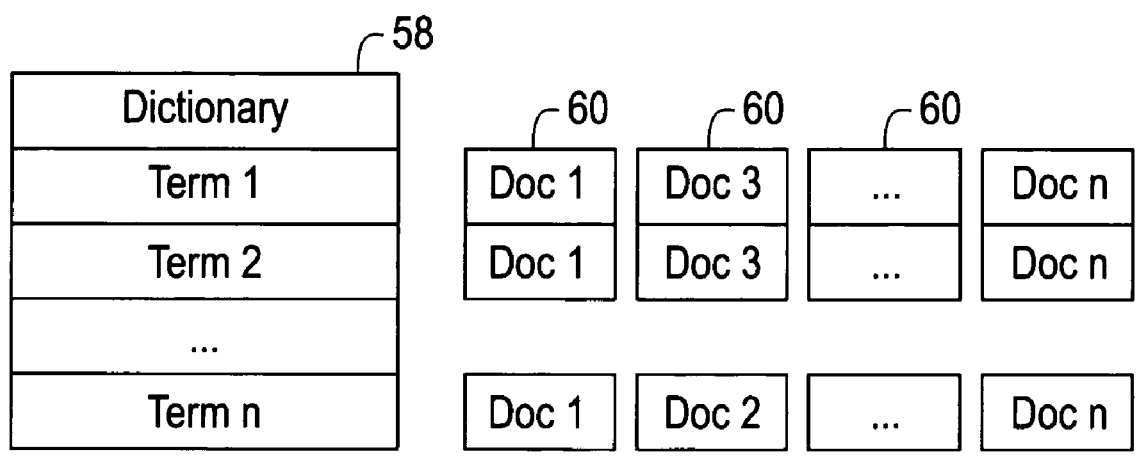

FIGS. 3-5 illustrate how the data structures discussed above can be generated. Commencing at block 40, a hierarchical structure of entity classes may be established. More specifically, consider that entities can be regarded as annotations which have been placed on a document either manually or automatically via an algorithm. In a non-limiting implementation each entity can be an unstructured information management architecture (UIMA) annotation which records the unique identifier of the entity, its location on the document, and the number of tokens by which the entity is represented. This information is then compiled into a vector of annotations per document as set forth further below. Block 40 recognizes that many annotations fall into classes of annotation, and entities are no different. In the example in the background, "Sam Palmisano" and "Steve Mills" are both of the "People" class of entities, whereas the annotation "IBM" is of the Organization class and "DB2" can be considered part of the Product class of entities. This non-limiting illustrative classification allows for a simple hierarchical structure of entities to be created:

/Entity/People/Sam Palmisano
/Entity/People/Steve Mills
/Entity/Organizations/IBM
/Entity/Products/DB2

When annotations are classified and structured in this manner, the logic can move to block 42 to examine each document (or a relevant subset thereof) in the corpus and determine entities, their locations, and the number of tokens associated with each entity to thereby establish annotation vectors. Multiple annotations may be produced at a given annotation location, e.g., at the location in a document of "Sam Palmisano", annotations for "Entity", "Entity/People", and "Entity/People/Sam Palmisano" can be produced.

FIG. 4 illustrates how annotation vectors are generated. While the example documents in FIG. 4 are in Web markup language, the invention is not limited to a particular format of document.

As shown, a raw document 44 with document ID, content, and other data known to those of skill in the art (crawl date, URL, etc.) can be stored at 46 and then operated on by an annotator 48 to produce an annotated document 50, which lists, among things, various entities in the document as shown. The annotated document 50 may also be stored at 46. An index component 52 then accesses the annotated documents 50 to produce annotation vectors 54, showing, for each entity, the documents in which it appears.

Proceeding to block 56 in FIG. 3, the annotation vectors are inverted by a software-implemented indexer such that for each document, a table of unique annotations is produced and the locations on the document where the annotation occurred are recorded. Within a non-limiting indexer, the location, span and unique entity identifiers are recorded for each location. When a given annotation has occurred more than once on a document, the annotation locations are structured as a list of annotations, sorted by the order the individual annotations occurred in the document. If an annotation is unique on a document, the table can be considered to point at a location list with a size of one.

Briefly referencing FIG. 5, as more documents are processed by the indexer, a unique annotation table 58 (referred to herein a dictionary) and the corresponding annotation lists are merged to produce the document table 60. Once all documents have been processed a final index as shown in FIG. 5 is produced which contains all the unique annotations and lists of the documents in which they have occurred, also preferably with the location within a document of each occurrence. The data structure of FIG. 5 facilitates efficient entity (term) lookup, efficient Boolean operations, and efficient storage of a large number of data records.

Returning once again to FIG. 3, the logic next moves to block 62 to define a set of inner entities and a set of outer entities. Notionally, the inner entities define the sub-row groups and the outer entities define the sub-rows within a group in the sparse matrix 30 of FIG. 2.

Thus, the inner set is the class of entities of primary interest. The inner set can be the set of all entities, or a subset of all entities. The outer set is the class of entities of interest for determining if a relationship exists between that entity and an inner entity, and this set may also be the set of all entities or only a subset thereof.

Once the classes of entities are defined, the lists of document locations for those classes are retrieved from the indexer, i.e., the data structures of FIGS. 4 and 5 are accessed. At block 64 the lists are scanned sequentially to determine all the pairs of inner and outer entities which occur within a given proximity boundary. Proximity boundaries can be within the same sentence, paragraph, document, or within a fixed number of tokens.

When a pair is determined to be within the proximity constraint, at block 66 a loop is entered in which the unique entity identifiers stored within the two locations are compared to each other at decision diamond 68 to ensure that the entities are unique. If they are the same, the process accesses the next pair (assuming the Do loop is not complete) at block 70 and loops back to decision diamond 68. On the other hand, if the entities are unique from each other the pair is appended to a list of all pairs which have been discovered at block 72.

Once the lists of locations have been exhausted (i.e., the DO loop is complete), the list of pairs is processed at block 74 to produce a table of all unique pairs which occurred and the number of times the pair occurred. This table is sorted in accordance with principles discussed above into the sparse matrix 30 of FIG. 2. The string table is likewise produced using the lists in FIGS. 4 and 5.

To execute a query, the sparse matrix 30 and string table may be used as follows. It is to be understood that other sparse matrices less preferably may be used, but in the preferred implementation the sparse matrix 30, advantageously ordered as discussed above, is used.

For an example query "which "N" medical conditions are most often mentioned with drug X?", the string table (which, recall, has the same order of entities as the sparse matrix) is accessed to locate the drug X (and hence the position of its group of sub-rows in the sparse matrix). Then the sparse matrix is accessed using the drug entity as entering argument, and the column represented by the highest sub-row in the group corresponding to a medical condition is retrieved. Since the sub-rows are in order of cardinality, the first sub-row indicates the entity in the corpus having the most co-occurrences with the drug X, and it is examined to determine whether it corresponds to a co-occurring entity that is classified as a "condition". If not, the next sub-row is examined, and so on, until the highest cardinality "N" sub-rows indicating the most frequently co-occurring conditions are identified. The result is then returned. For a simpler query, e.g., "which drug is most often mentioned on the Web", the string table is accessed from the beginning to find the highest cardinality entity that has been classified as a drug, and the result returned.

An s-web of around thirty thousand co-occurrence entries may be smaller than two gigabytes. This means that these "co-occurrence snapshots" can fit easily on removable media (DVD, CD, thumb drive, etc). Applications can be included on this media as well, allowing stand alone delivery of these facts which customers can explore to discover actionable business insights.

While the particular SYSTEM AND METHOD FOR CREATION, REPRESENTATION, AND DELIVERY OF DOCUMENT CORPUS ENTITY CO-OCCURRENCE INFORMATION is herein shown and described in detail, it is to be understood that the subject matter which is encompassed by the present invention is limited only by the claims.

What is claimed is:

1. A computer implementing a method for responding to queries for information in a document corpus, the method implemented by the computer comprising:

receiving the query;

using at least a portion of the query as an entering argument to access a string table having an index and corresponding data, the index being a concatenated list of integers providing offsets of various character strings, the index being followed by per-string data listing each entity represented in a sparse matrix, the entities in the string table being listed in order of frequency of occurrence in a document corpus, one and only one person entity being entered in the matrix even if a person establishing the entity is referred to by plural phrases different from each other in the corpus;

using a selection from the string table selected in response to the portion of the query to access a sparse matrix; and returning a response to the query at least in part based on the access of the sparse matrix, wherein the document corpus includes World Wide Web pages and the sparse matrix includes entity representations that are respective groups of sub-rows in the sparse matrix, wherein the groups are sorted relative to each other from most occurring entity to least occurring entity, with each sub-row of a group corresponding to an entity co-occurring in the document corpus with the entity represented by the group, and furthermore wherein the sub-rows within a group of sub-rows are internally sorted independently of other groups of sub-rows based on frequencies of co-occurrences within the group, from a first a sub-row indicating a highest number of co-occurrences to a last sub-row indicating a lowest number of co-occurrences.

* * * * *